United States Patent [19]

Nilssn

[11] Patent Number: 4,963,795
[45] Date of Patent: Oct. 16, 1990

[54] STEP-CONTROLLABLE ELECTRONIC BALLAST

[76] Inventor: Ole K. Nilssn, Caesar Drive, Barrington, Ill. 60010

[21] Appl. No.: 317,906

[22] Filed: Mar. 2, 1989

Related U.S. Application Data

[63] Continuation-in-part of Ser. No. 300,579, Jan. 23, 1989.

[51] Int. Cl.$^5$ ............... H05B 37/00; H05B 39/00; H02M 3/24; H02M 7/538
[52] U.S. Cl. ............... 315/205; 315/219; 315/313; 315/320; 363/74; 363/95; 363/100; 363/132
[58] Field of Search ............... 315/DIG. 7, DIG. 4, 315/219, 205, 186, 208, 209 R, 224, 226, 288, 313, 320; 363/132, 95, 74, 100

[56] References Cited

U.S. PATENT DOCUMENTS

| | | | |
|---|---|---|---|
| 3,909,666 | 9/1975 | Tenen | 315/DIG. 4 |
| 4,284,925 | 8/1981 | Bessone et al. | 315/DIG. 4 |
| 4,346,332 | 8/1982 | Walden | 315/DIG. 4 |
| 4,383,204 | 5/1983 | Roberts | 315/DIG. 4 |
| 4,471,269 | 9/1984 | Ganser et al. | 315/DIG. 7 |
| 4,811,186 | 3/1989 | Vargo | 315/DIG. 7 |

FOREIGN PATENT DOCUMENTS

| | | | |
|---|---|---|---|
| 2225908 | 11/1974 | France | 315/219 |
| 0180076 | 2/1977 | Japan | 315/DIG. 4 |

Primary Examiner—Eugene R. LaRoche
Assistant Examiner—Michael B. Shingleton

[57] ABSTRACT

An inverter-type fluorescent lamp ballast is powered from the power line by way of a common and either of two (or more) different power leads. When powering the ballast by way of the common and the first one of these two power leads, the power provided to the fluorescent lamp load is relatively high; when powering the ballast by way of the common and the second one of these two power leads, the power provided to the fluorescent lamp load is relatively low. The ballast itself is a self-oscillating half-bridge inverter loaded by way of a series-tuned high-Q LC circuit connected across its output. A pair of fluorescent lamps is series-connected across the tank-capacitor of the LC circuit. The inverter has two bipolar transistors, each driven by an associated saturable current transformer that provides for a transistor ON-time dependent upon the magnitude of an associated bias voltage. One of the transistors has a control arrangement connected in circuit with its associated saturable transformer and is operative to control the magnitude of its associated bias voltage. As the magnitude of this bias voltage is controlled, the magnitude of the voltage across the tank-capacitor, as well as of the current available therefrom, is correspondingly controlled. The magnitude of the bias voltage is controlled as a function of the path of the input current from the power line; which path depends on the particular lead being used.

16 Claims, 2 Drawing Sheets

STEP-CONTROLLABLE ELECTRONIC BALLAST

Related Application

Instant application is a Continuation-in-Part of application Ser. No. 07/300,579 filed Jan. 23, 1989.

BACKGROUND OF THE INVENTION

1. Field of the Invention

The present invention relates to an electronic ballast for gas discharge lamps, particularly of a type wherein ballast power output is controllable by way of the ballast's power input leads.

2. Description of Prior Art

Ballasts with controllable power output have been previously described, such as in U.S. Pat. No. 4,677,345 to Nilssen; wherein is described a means for controlling the power supplied to a fluorescent lamp by way of controlling the temperature of a pair of saturable current transformers used for determining the frequency in a self-oscillating half-bridge inverter loaded by way of a high-Q series-resonant LC circuit. The higher the temperature, the lower the resulting power output.

SUMMARY OF THE INVENTION

Objects of the Invention

One object of the present invention is that of providing for a cost-effective ballastinq means for powering gas discharge lamps.

A more specific object is that of providing for control means in a series-resonance-loaded inverter ballast.

Another more specific object is that of providing an electronic ballast the power output from which may be controlled by way of its power input leads.

These as well as other objects, features and advantages of the present invention will become apparent from the following description and claims.

Brief Description

A inverter-type fluorescent lamp ballast is powered from the power line by way of a common and either of two (or more) different power leads. When powering the ballast by way of the common and the first one of these two power leads, the power provided to the fluorescent lamp load is relatively high; when powering the ballast by way of the second one of these two power leads, the power provided to the fluorescent lamp load is relatively low.

The ballast itself is a self-oscillating half-bridge inverter loaded by way of a series-tuned high-Q LC circuit connected across its output. A pair of fluorescent lamps is series-connected across the tank-capacitor of the LC circuit. The inverter has two bipolar transistors, each driven by an associated saturable current transformer that provides for a transistor ON-time dependent upon the magnitude of an associated bias voltage.

One of the transistors has a control arrangement connected in circuit with its associated saturable transformer and is operative to control the magnitude of its associated bias voltage. As the magnitude of this bias voltage is controlled, the magnitude of the voltage across the tank-capacitor, as well as of the current available therefrom, is correspondingly controlled.

The magnitude of the bias voltage is automatically controlled such that: (a) with the lamps not-yet-ignited, the magnitude of the voltage across the tank-capacitor is maintained at a level somewhat higher than normal lamp operating voltage, except that for 10 milli-seconds once each second the magnitude is increased to a level high enough to cause lamp ignition; and (b) after the lamps have ignited, the magnitude of the lamp current is limited to an adjustably preset level.

In turn, the magnitude of the adjustably preset level is controlled as a function of the path of the input current from the power line; which path depends on whether the first or the second power lead is used for powering the ballast.

DESCRIPTION OF THE PREFERRED EMBODIMENT

Details of Construction

Figure 1:
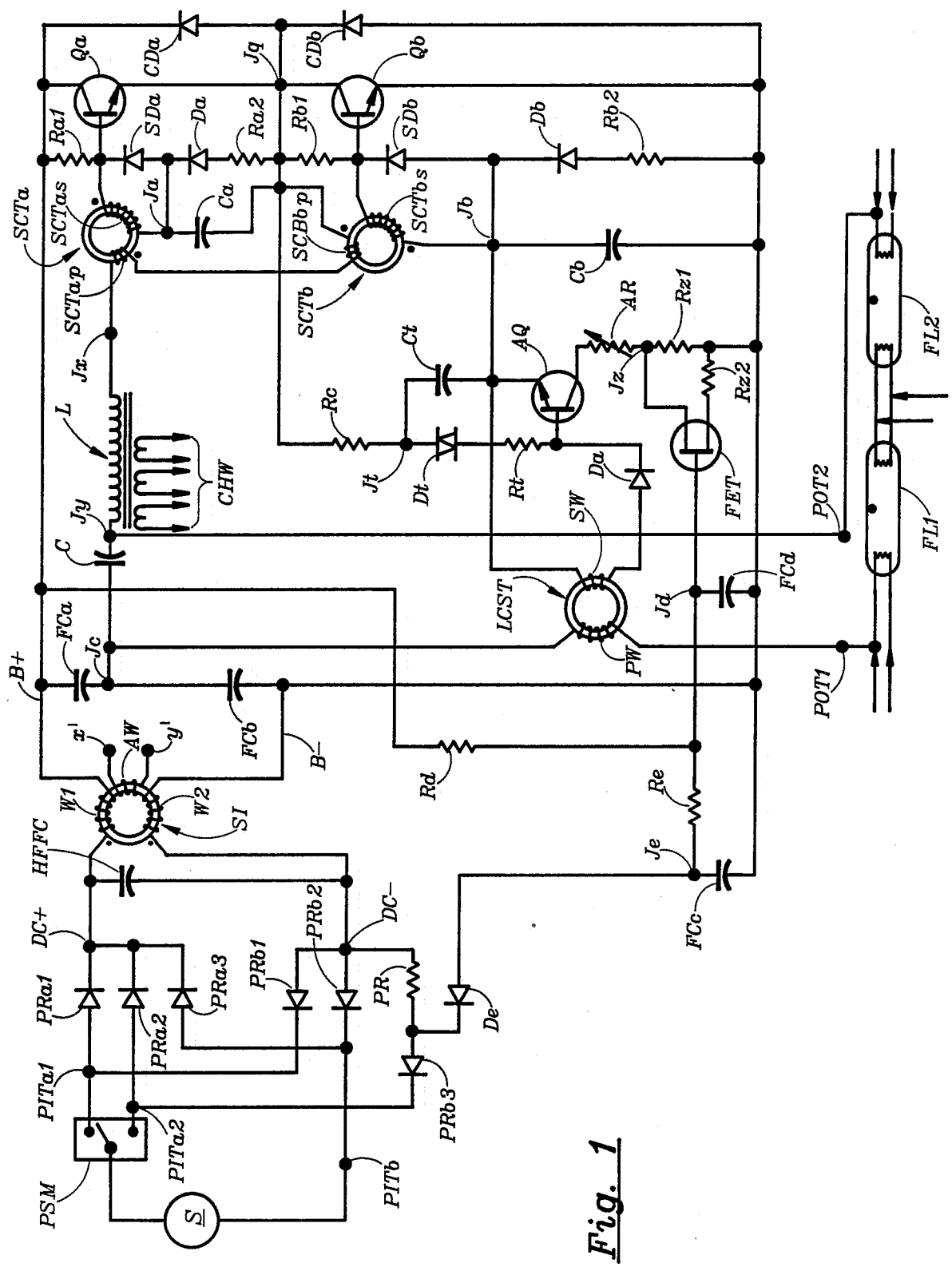
FIG. 1 provides a basic electrical circuit diagram of the preferred embodiment of the invention.

In FIG. 1, a source S of ordinary 120Volt/60Hz power line voltage is applied to power input terminal PITb and, by way of power switch means PSM, to either of power input terminals PITa1 or PITa2.

Power input terminal PITa1 is connected with the anode of a power rectifier PRa1 and with the cathode of a power rectifier PRb1; power input terminal PITa2 is connected with the anode of a power rectifier PRa2 and with the cathode of a power rectifier PRb3; and power input terminal PITb is connected with the anode of a power rectifier PRa3 and with the cathode of a power rectifier PRb2. The cathodes of power rectifiers PRa1, PRa2 and PRa3 are all connected with a positive terminal DC+; the anodes of power rectifiers PRb1 and PRb2 are both connected with a negative terminal DC−; and the anode of power rectifier PRb3 is connected with the DC− terminal via a power resistor PR. A high-frequency filter capacitor HFFC is connected between the DC+ terminal and the DC− terminal.

A first winding W2 of an EMI suppression inductor SI is connected between the DC+terminal and a B+bus; and a second winding W2 of EMI suppression inductor SI is connected between the DC− terminal and a B− bus.

An auxiliary winding AW is wound on EMI suppression inductor SI; which auxiliary winding has output terminals x' and y'.

A filter capacitor FCa is connected between the B+bus and a junction Jc; a filter capacitor FCb is connected between junction Jc and the B− bus. A switching transistor Qa is connected with its collector to the B+bus and with its emitter to a junction Jq; and a switching transistor Qb is connected with its collector to junction Jq and with its emitter to the B− bus. A commutating diode CDa is connected between the B+bus and junction Jq, with its cathode connected with the B+bus; and a commutating diode CDb is similarly connected between junction Jq and the B− bus.

A saturable current transformer SCTa has a secondary winding SCTas connected between the base of transistor Qa and a junction Ja; a saturable current transformer SCTb has a secondary winding SCTbs connected between the base of transistor Qb and a junction Jb. Saturable current transformers SCTa and SCTb, respectively, have primary windings SCTap and SCTbp; which primary windings are series-connected between junction Jq and a junction Jx.

A resistor Ra1 is connected between the collector and the base of transistor Qa; a resistor Rb1 is connected between the collector and the base of transistor Qb. A capacitor Ca is connected between junction Ja and the emitter of transistor Qa; a capacitor Cb is connected between junction Jb and emitter of transistor Qb. A diode Da is connected with its cathode to junction Ja and, by way of a resistor Ra2, with its anode to the emitter of transistor Qa; a diode Db is connected with its cathode to junction Jb and with its anode to the emitter of transistor Qb. A shunt diode SDa is connected with its cathode to the base of transistor Qa and with its anode to junction Ja; a shunt diode SDb is connected with its cathode to the base of transistor Qb and with its anode to junction Jb.

An auxiliary transistor AQ is connected with its emitter to junction Jb and with its collector to a junction Jz by way of an adjustable resistor AR. A resistor Rz1 is connected between junction Jz and the B− bus. A field effect transistor FET is connected with its source to junction Jz and with its drain to the B− bus by way of a resistor Rz2. A filter capacitor FCd is connected between the B− bus and a junction Jd; the gate of transistor FET is connected with junction Jd. A resistor Rd is connected between the B+bus and junction Jd; and a resistor Re is connected between junction Jd and a junction Je. A filter capacitor FCe is connected between junction Je and the B− bus. A diode De is connected with its anode to junction Je and with its cathode to the anode of power rectifier PRb3.

A tank-inductor L is connected between junction Jx and a junction Jy; and a tank-capacitor C is connected between junctions Jy and Jc. A power output terminal POT1 is connected with junction Jc by way of a primary winding PW of a lamp current sensing transformer LCST; another power output terminal POT2 is connected directly with junction Jy. First and second fluorescent lamps FL1 and FL2 are series-connected between power output terminals POT1 and POT2. Tank-inductor L has three cathode heater windings CHW; which are connected with the cathodes of fluorescent lamps FL1 and FL2.

A capacitor Ct is connected between junction Jb and a junction Jt. A Diac Dt is series-connected with a resistor Rt to form a series-combination, which series-combination is connected between junction Jt and the base of transistor AQ. A resistor Rc is connected between junctions Jq and Jt.

A secondary winding SW of transformer LCST is connected between the emitter of auxiliary transistor AQ and the anode of a diode Da, whose cathode is connected with the base of transistor AQ.

Details of Operation

The basic operation of the half-bridge inverter of FIG. 1 is conventional and is explained in conjunction with FIG. 3 of U.S. Pat. No. 4,307,353 to Nilssen.

For a given magnitude of the DC supply voltage, due to the effect of the high-Q LC circuit, the magnitude of the current provided to the fluorescent lamp load (or to any other load presented to the output) is a sensitive function of the frequency and the waveshape of the inverter's output voltage; which output voltage is a substantially squarewave voltage of controllable frequency and with peak-to-peak magnitude about equal to that of the instantaneous magnitude of the DC voltage present between the B− bus and the B+ bus.

The frequency of the inverter's squarewave output voltage is a sensitive function of the natural resonance frequency of the high-Q LC circuit as well as of the duration of the forward conduction period (i.e., the ON-period) of the two inverter switching transistors; which duration, in turn, is a sensitive function of the saturation characteristics of saturable current transformers SCTa and SCTb as combined with the magnitude of the bias voltages present on capacitors Ca and Cb. That is, the duration of the forward conduction period (the ON-time) of each switching transistor is determined by the volt-second product sustainable by its associated saturable current transformer as well as by the magnitude of the negative bias on capacitors Ca and Cb: the higher the volt-second product available before saturation, the longer the ON-time; the higher the negative bias on the Ca/Cb capacitors, the shorter the ON-time.

In the circuit arrangement of FIG. 1, the magnitude of the negative voltage on capacitors Ca and Cb is determined by the magnitude of the current provided to the bases of transistors Qa and Qb, less any current drained away through resistors R2a and Rb2/AR/Rz1/Rz2, respectively. (Of course, a small amount of current is also drained away from bias capacitors Ca and Cb by resistors Ra1 and Rb1, respectively. However, this amount of charge leakage is in most situations negligible. Resistors Ra1 and Rb1 are principally used for getting the inverter to initiate oscillation.)

The magnitude of the base current provided to each transistor is directly proportional to the magnitude of the current flowing through the primary windings of saturable current transformers SCTa and SCTb.

Assuming transistors AQ and FET to be conducting, for given values of resistors Ra2 and Rb2/AR/Rz1/Rz2: the higher the magnitude of the inverter's output current, the higher the magnitude of the negative voltage on capacitors Ca and Cb.

Thus, for given values of resistors Ra2 and Rb2/AR/Rz1/Rz2, the circuit of FIG. 1 provides for a high degree of regulation of the magnitude of the inverter's output current.

By selecting a suitable resistance value for resistor Ra2, and assuming transistor AQ to be conducting, the magnitude of the inverter's output current may be adjusted by adjusting the resistance value of AR: a relatively low resistance value leads to an inverter output current of relatively high magnitude; a relatively high resistance value leads to an inverter output current of relatively low magnitude.

The higher the magnitude of the negative voltage on each bias capacitor, the higher the magnitude of the voltage that has to be provided from the secondary winding of each saturable current transformer; which, in turn, leads to a correspondingly shorter period before saturation is reached. Thus, as the magnitude of the negative bias on each bias capacitor is increased, the duration of each transistor's forward conduction period (ON-time) is decreased; which, in turn, leads to a reduction in the magnitude of the inverter's output current in comparison with what it otherwise would have been.

Whereas the base current provided to each transistor has to flow from its associated bias capacitor, the reverse or reset current provided from each of the saturable current transformer's secondary windings does not flow from the bias capacitor, but rather flows in a separate path through the reverse shunt diode (SDa or SDb) shunting the secondary winding of each saturable current transformer.

More particularly, the circuit and control arrangement of FIG. 1 operates as follows.

As power is applied at power input terminals PITb and PITa1 (or PITa2), the inverter starts to oscillate at a frequency near the natural self-resonance frequency of the LC circuit. The resulting inverter output current results in a positive feedback current provided to each base; and this feedback current, in turn, causes a negative bias to build up on each of bias capacitors Ca/Cb. As the magnitude of the negative bias voltage increases, the inverter's oscillation frequency increases as well. As a result, the magnitude of the inverter output current will stabilize at a some level determined by the effective resistance values of resistors Ra2 and Rb2/AR/Rz1/Rz2.

With the fluorescent lamps non-connected or otherwise non-functional, transistor AQ is effectively non-conducting; and under this non-loaded condition the magnitude of the high-frequency (30 kHz or so) inverter current stabilizes at a level determined by the resistance values of resistors Ra2 and Rb2.

With the fluorescent lamps connected and fully operating (i.e., fully loading the LC circuit), transistor AQ is conducting by virtue of the current provided to its base by way of lamp current sensing transformer LCST; and transistor FET is conducting as well by virtue of the positive bias voltage provided to its gate by way of resistors Rd and Re. Under this condition, the effect of resistor Rb2 may be neglected because its resistance is much higher than that effectively represented by resistors AR/Rz1/Rz2; and—provided the power line voltage from source S is indeed connected between power input terminals PITa1 and PITb—the magnitude of the high-frequency inverter output current stabilizes at a level effectively determined by the resistance values of resistors Ra2 and AR as series-connected with the parallel-combination of resistors Rz1 and Rz2.

With transistor FET non-conducting, which will occur whenever the power line voltage is connected between power input terminals PITa2 and PITb, the magnitude of the high-frequency inverter output current will effectively be determined by the resistance values of Ra2 and AR as series-connected with resistor Rz1 by itself.

Thus, with the power line connected between power input terminals PITa2 and PITb, the high-frequency inverter output current will be limited to a magnitude lower than that resulting when the power line is connected with power input terminals PITa1 and PITb.

In terms of further explanations whenever the power line voltage is connected between power input terminals PITa1 and PITb, no current flows through resistor PR; and, as a result, the DC voltage developing at junction Jd will be of adequate (positive) magnitude to cause transistor FET to become conductive; whenever the power line voltage is connected between power input terminals PITa2 and PITb, current will flow through resistor PR; which current will result in a 60 Hz pulsed DC voltage across resistor PR. The polarity of this voltage, as referenced to the B— bus, will be negative; and, as a result, the effective magnitude of the DC voltage provided at junction Jd will decrease enough to cause transistor FET to stop conducting.

Thus, with the power line voltage applied between terminals PITa1 and PITb, transistor FET conducts and the magnitude of the inverter's output current is relatively large; with the power line voltage applied between terminals PITa2 and PITb, transistor FET does not conduct and the magnitude of the inverter's output current is relatively small.

More particularly, the resistance value of resistor Ra2 is selected such that the ON-time of transistor Qa corresponds to nearly a 50% duty-cycle. Then, with transistor AQ non-conducting, the resistance value of Rb2 is selected such as to result in an inverter output current of magnitude such as to provide for a high-frequency voltage across the tank-capacitor that is equal (or slightly larger) in magnitude than that of the voltage across the fluorescent lamps under normal lamp operation. Next, with adjustable resistor AR set at minimum value, and with the power line connected between terminals PITa2 and PITb, the resistance value of resistor CLR1 is selected such as to result in a lamp operating current of a magnitude substantially below that of the maximum desired lamp operating current. Next, again with adjustable resistor AR set at minimum value, but with the power line connected between terminals PITa1 and PITb, the value of resistor CLR2 is selected such as to provide lamp operating current of the maximum desired magnitude.

Under the condition of normal lamp loading of the LC circuit, the RMS magnitude of the voltage provided to the lamp cathodes is so selected as to provide for proper cathode heating. Thus, as the circuit is initially powered, even though the lamps have not yet ignited, the cathodes are provided with a heating voltage of RMS magnitude approximately appropriate for proper cathode heating; yet, the magnitude of the high-frequency voltage then provided across the lamps is too low to cause lamp ignition. However, by action of the trigger arrangement consisting of elements Rc, Ct, Dt and Rt, after about one second (and once each second thereafter), a current pulse of about 10 milli-second duration will be provided to the base of transistor AQ, thereby making this transistor conduct for a period of about 10 milli-seconds. During this 10 milli-second period, the magnitude of the high-frequency voltage across the tank-capacitor will increase substantially, and the lamps will ignite.

During the 10 milli-second period, the magnitude of the cathode heating voltages also increases substantially, thereby aiding in lamp ignition. However, on an integrated RMS basis, this brief period of increased-magnitude cathode heating voltage is of little consequence.

As soon as the lamps ignite, lamp current will start to flow; and, by way of transformer LCST, transistor AQ will now become fully conducting on at least a 50% duty-cycle basis; which implies that the 10 milli-second pulses that will continue to be provided every second or so will be of little consequence.

If the lamps were to be disconnected, however, the repeatedly provided 10 milli-second pulses will assure that affirmative lamp ignition will occur as soon as fully functional lamps are re-connected.

As long as transistor AQ is kept conductive, the fluorescent lamps will be powered in a normal manner; and the relative magnitude of the lamp current then flowing will depend on the particular setting of adjustable resistor AR. The absolute maximum magnitude of the lamp current will depend on which of terminals PITa1 and PITa2 the power line is connected to.

In case of a ground-fault condition—which typically might occur if fluorescent lamp FL2 were to be connected at its one end with power output terminal POT2 while a ground-connected person held onto the lamp's terminals at its other end -- high-frequency current would flow out from the ballast at terminal POT2, through the lamp and the person to ground, and then eventually back to the ballast by way of one or both of the power input terminals (PIT1/PIT2. However, since necessarily this condition would require that lamp current stop flowing through lamp current sensing transformer LCST, transistor AQ would cease to conduct and the magnitude of any current then flowing from output terminal POT2 would be limited to a level that is substantially lower than that of full-power lamp current. In particular, the magnitude of the resulting ground-fault current will only be on the order of 30 milli-Ampere; which is a level that—at a frequency of 30 kHz or so—is considered by authoritative entities, such as Underwriters Laboratories, Inc. of Northbrook, Ill., as being substantially non-hazardous.

Figure 2:
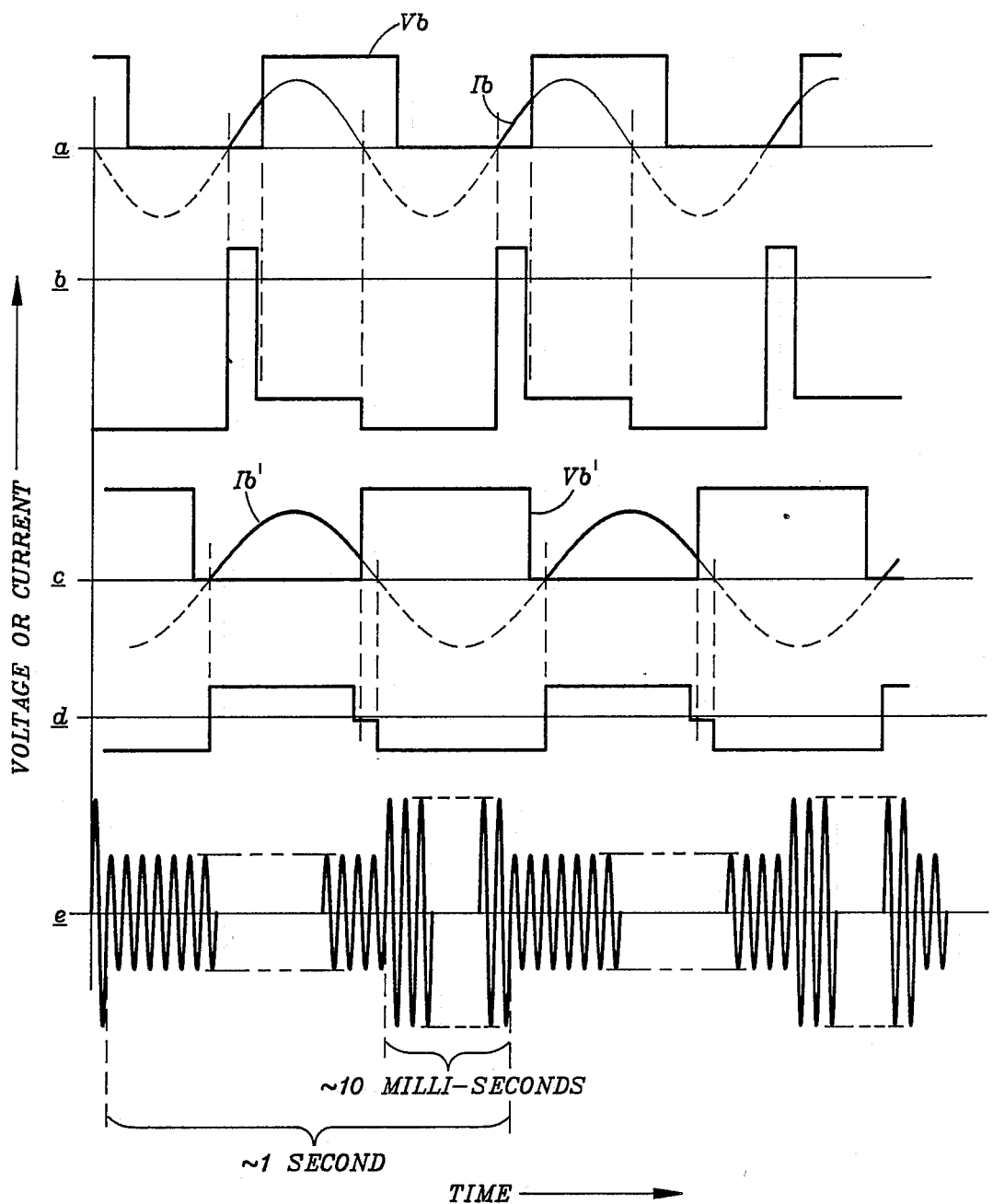
FIG. 2 illustrates waveshapes of various high frequency voltages and currents present within the circuit during different modes of operation.

FIG. 2 depicts various voltage and current waveforms associated with the circuit of FIG. 1.

For a situation with no loading presented to the high-Q LC circuit—that is, with the lamps disconnected, or before the lamps have ignitied—FIG. 2a shows the collector-to-emitter voltage Vb of transistor Qb and the corresponding inverter output current Ib. The part of Ib actually flowing through transistor Qb in the forward direction is shown in heavy solid line, the part of Ib flowing through commutating diode CDa is showed in light solid line, and the part of Ib flowing through either Qa or CDb is shown in light dashed line.

FIG. 2b shows the base-emitter voltage of transistor Qb as it corresponds to the waveforms of FIG. 2a.

For a situation where the LC circuit is substantially fully loaded by the two fluorescent lamps, FIG. 2c shows the collector-to-emitter voltage Vb' of transistor Qb and the corresponding inverter output current Ib'. The part of Ib' actually flowing through transistor Qb in the forward direction is shown in heavy solid line, the part of Ib' flowing through commutating diode CDa is showed in light solid line, and the part of Ib' flowing through either Qa or CDb is shown in light dashed line.

FIG. 2d shows the base-emitter voltage of transistor Qb as it corresponds to the waveforms of FIG. 2c.

FIG. 2e shows the waveshape of the high-frequency voltage present across the tank-capacitor under the condition of an unloaded LC circuit: a continuous substantially sinusoidal voltage of a relatively low magnitude, interrupted once each second with a 10 millisecond long burst of relatively high-magnitude substantially sinusoidal voltage.

Additional Comments (a) Detailed information relative to a fluorescent lamp ballast wherein the fluorescent lamp is powered by way of a series-excited parallel-loaded L-C resonant circuit is provided in U.S. Pat. No. 4,554,487 to Nilssen.

(b) The instantaneous peak-to-peak magnitude of the squarewave output voltage provided by the half-bridge inverter between junctions Jq and Jc is substantially equal to the instantaneous magnitude of the DC supply voltage.

(c) Saturable current transformers SCTa and SCTb require only a miniscule voltage across their primary windings. Hence, the magnitude of the voltage-drop between junctions Jq & Jx is substantially negligible, and the inverter's full output voltage is therefore effectively provided across the LC circuit, which consists of tank-capacitor C and tank-inductor L.

(d) In FIG. 2, the inverter frequency associated with the waveforms of FIGS. 2a and 2b is substantially higher than that associated with FIGS. 2c and 2d.

Also, current Ib is nearly 180 degrees out of phase with the fundamental frequency component of voltage Vb, while current Ib' is almost in phase with voltage Vb'.

(e) In the situation associated with the waveform of FIG. 2b, the magnitude of the voltage "seen" by the secondary winding of saturable current transformer SCTb is about five times as high as that "seen" by the same secondary winding in the situation associated with FIG. 2d.

Correspondingly, the duration of the transistor ON-time in the situation associated with FIG. 2d is about five times longer than the transistor ON-time in the situation associated with the waveform of FIG. 2b.

(f) As may be noticed in FIG. 2a, transistor Qb ceases to conduct in its forward direction while a substantial amount of current is still flowing from the inverter's output. After transistor Qb has ceased to conduct, the inverter's output current will continue to flow until the energy in the tank inductor has dissipated itself. However, the output current will continue its flow through commutating diode CDa, thereby discharging its energy into the DC power supply.

(g) Forward conduction of a transistor is defined as current flowing, with the aid of forward base drive current, directly between the collector and the emitter; which, in case of transistor Qb for, instance, means that forward current is defined as positive current flowing from its collector to its emitter while drive current is being provided to its base.

A transistor's ON-time is defined as the period during which it conducts current in the forward direction.

(h) In FIG. 2 it is noted that the fundamental frequency of the waveforms depicted in FIGS. 2c and 2d is lower by a certain factor as compared with the frequency associated with the waveforms of FIGS. 2a and 2b; yet the indicated duration of transistor ON-time associated with the waveforms of FIGS. 2a and 2b is shorter by a much larger factor as compared with the indicated duration of transistor ON-time associated with the waveforms of FIGS. 2c and 2d.

In fact, when the transistor ON-time is shortened by a given proportion, the fundamental frequency of the inverter's output voltage increases by a much smaller proportion. In instant case, with the Qb transistor's ON-time shortened by a factor of about five, the inverter frequency increased only by a factor of about 1.3: from about 30 kHz to about 40 kHz.

(i) The time constant associated with each bias capacitor and its associated leakage resistance means is normally longer than a complete cycle of the high frequency inverter output voltage, and it is typically on the order of several such complete cycles.

For instance, for a situation where the power line input voltage is 120Volt/60Hz, the frequency of the inverter output voltage/current is on the order of 30 kHz, and the total inverter power output falls in the range between 10 and 100 Watt, the capacitance values of bias capacitors Ca and Cb might reasonably be in the range from one to ten micro-Farad, the resistance value of leakage resistor Ra2 might reasonably be in the range between 10 and 100 Ohm, the resistance value of adjustable resistor AR might resonably be adjustable over a range between zero and 100 Ohm, and the resistance values of resistors Rz1 and Rz2 might each reasonably be in the range between 5 to 50 Ohm.

Thus, in general, the magnitude of the bias voltage on the bias capacitors is responsive to the average magnitude of the inverter's output current—normally as averaged over at least a full cycle of this output current.

(j) With power input terminals PITa1/PITa2 and PITb connected with an ordinary electric utility power line, all electrical parts of the circuit arrangement of FIG. 1 are effectively connected with earth ground by way of those power input terminals.

(k) Although not expressly shown in FIG. 1, it is emphasized that fluorescent lamps FL1 and FL2 are connected with terminals POT1 and POT2 by way of lamp socket means of a type that has electrical terminal means that are non-accessible to a person's fingers or the like. However, the terminal means of the fluorescent lamps themselves are of a type that does permit a person to touch them directly, provided they are not inserted into their sockets.

Thus, in a situation where the circuit arrangement of FIG. 1 is used as a fluorescent lamp ballasting means, and under otherwise ordinary circumstances, the only way that a person is able to get exposed to a ground-fault current from the circuit arrangement of FIG. 1 is by holding on to the terminals at one end of a fluorescent lamp while inserting the other end into a lamp socket connected with the POT2 or the "hot" terminal.

(l) In the circuit arrangement of FIG. 1 there are two distinctly different kinds of magnitude-limiting of the inverter's output current. One is the ordinary kind associated with the natural characteristics of a series-excited parallel-loaded resonant LC circuit; another is due to the action of the control circuit associated with auxiliary transistor AQ.

(m) Due to basic factors related to magnetic hysteresis and leakage iductance, lamp current sensing transformer LCST requires the lamp current to have a certain minimum magnitude before producing an output signal of magnitude adequate to cause auxiliary transistor AQ to become conductive. Hence, there is a minimum threshold level automatically built into the control means used for sensing lamp current. This threshold level may readily be changed, for instance by changing the number of turns on primary winding PW, or by placing a shunting impedance across secondary winding SW.

(n) In the control circuit related to and including auxiliary transistor AQ, there are to main control effects: (i) one associated with the fact that the magnitude of the bias voltage on capacitor Cb tends to vary around an average level as a function of the average absolute magnitude of the inverter's output current, and (ii) one associated with the fact that the average level around which the bias voltage varies may itself be varied, such as by varying the magnitude of the base current provided to auxiliary transistor AQ.

(o) Without any substantial loading on the LC circuit, its Q-factor is quite high, and—absent proper control measures —the magnitude of the voltage developing across the tank-capacitor tends to become destructively high.

A large-magnitude voltage across the tank-capacitor must by necessity be associated with an inverter output current of correspondingly large magnitude. However, a large-magnitude inverter output current will cause a correspondingly high-magnitude negative bias on both bias capacitors, but—absent lamp current of magnitude sufficient to place transistor AQ into conduction—particularly on bias capacitor Cb: the two bias capacitors have to provide a positive current of magnitude proportional to the average absolute magnitude of the inverter's output current; which means that the magnitude of the negative bias voltage will have to increase with increasing magnitude of the inverter output current.

It is this negative feedback feature, which relates to negative feedback of the rectified average magnitude of the inverter's output current (i.e., DC negative feedback), that provides for stable controllable operation of a self-oscillating inverter whose output is connected across an unloaded high-Q series-connected LC circuit.

(p) In fact, the circuit arrangement of FIG. 1 may be defined as an inverter that is loaded by way of a high-Q tuned LC circuit and arranged to self-oscillate by way of positive AC feedback derived from the inverter's instantaneous output current (and/or voltage) while at the same time arranged to provide for controllable-magnitude output current (and/or voltage) by way of negative DC feedback derived from the average absolute magnitude of the inverter's output current (and/or voltage).

(q) So as to fully reset the saturable cores each cycle, diodes SDa and SDb should each have a relatively high-magnitude forward voltage drop, such as might be obtained by using two or three ordinary diodes in series. However, instead of using special diodes with high-magnitude forward voltage drops, it is acceptable to use ordinary diodes with added series-resistors, thereby effectively to increase their forward voltage drops.

(r) With adjustable resistor AR set to zero and with the power line connected with power input terminal PITa1, the magnitude of the relatively high-magnitude high-frequency voltage of FIG. 2e is established-by suitable choice of the resistance value of resistor Rz1 as parallel-connected with resistor Rz2.

(s) Some of the values associated with operating the ballast with the kind of waveform indicated by FIG. 2e are as follows: (i) relaxed specifications for the tank-inductor; (ii) relaxed specifications for the tank-capacitor; (iii) reduced glow current prior to lamp ignition, thereby providing increased lamp life; (iv) improved lamp starting; (v) reduced idling power; and (vi) cost-effective compliance with U.L. specifications related to ground-fault current.

(t) The RMS magnitude of the cathode heating voltage, which voltage is provided to each of the lamps' thermionic cathodes by way of cathode heating windings CHW, is such as to provide for proper cathode heating during the period before the lamps ignite, as well as on a continuous basis thereafter.

During the brief pulses provided by way of elements Rc, Ct, Dt and Rt, the RMS magnitude of the cathode heating voltage is increased to about twice normal value. However, since the duration of each of these pulses is so brief (about 10 milliseconds) compared with the duration of each of the periods between such pulses (about 1000 milli-seconds), the net effect on the temperature of the cathodes is negligible. However, with respect to lamp ignition, the effect is substantial and beneficial. The briefly elevated RMS magnitude of the cathode voltage gives rise to ionization of the lamp gas along the cathodes' surfaces, thereby greatly facilitating the ignition of the main gas columns of the lamps.

(u) With the series-connected LC circuit unloaded, the RMS magnitude of the high-frequency output voltage, as provided at output terminals POT1-/POT2, is determined by the value of resistor Rb, except for the brief one milli-second intervals (see FIG. 2e). During these one milli-second intervals, the RMS magnitude of the high-frequency output voltage is determined by the combined resistance values of AR, Rz1 and Rz2.

(v) By providing for additional sets of elements corresponding to PRa2, PRb3, PR, Dc, FCe, Re, Rd, FCd, FET and Rz2, correspondingly additional levels of ballast output power may be provided for.

In particular, a ballast may have one common power input terminal (PITb) and any number of separate individual power input terminals PITa1, PITa2, PITa3—PITan, with each separate individual power input terminal corresponding to a given ballast output power.

(w) In the arrangement of FIG. 1, the frequency of the current provided to the fluorescent lamps changes with the amount of power provided to the lamps: the higher the amount of power, the lower the frequency. This effect is directly related to the situation illustrated in FIG. 2: the higher the negative bias on bias capacitor Cb (see FIG. 2b versus FIG. 2d), the higher the frequency, and the less the power provided to the load.

Thus, when power line voltage is switched from terminal PITa1 to terminal PITa2, the inverter frequency increases.

(x) In some situations, to eliminate the possibility of problems associated with leakage current through Diac Dt and/or with transients picked up by lamp current sensing transformer LCST, it may be advantageous to place a resistor in parallel with the base-emitter junction of transistor AQ.

(y) In the arrangement of FIG. 1, the power line voltage from S may be applied either across a first pair or a second pair of input terminals: the first pair being terminals PITa1 and PITb; the second pair being terminals PITa2 and PITb.

It is emphasized, however, that in some situations it may be better to arrange from the power line voltage to be applied either: (i) across the second pair of power input terminals; or (ii) across both the first and the second pair of power input terminals. In this latter case, control of light output may be accomplished by way of a simple single-pole ON/OFF switch.

(z) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
a source of alternating supply voltage;
lamp means having lamp terminals; and
power supply means having a first, a second and a third power input terminal; the power supply means having output terminals connected with the lamp terminals and being operative to provide AC power to the lamp means in response to being provided with the supply voltage between the first and either the second or the third power input terminal; the AC power being associated with an AC voltage; the frequency of the AC voltage being substantially higher than that of the voltage normally present at an ordinary electric utility power line; the AC power having a magnitude that is substantially higher when the supply voltage is provided between the first and the second power input terminal as compared with a situation wherein the supply voltage is provided between the first and the third power input terminal.

2. The arrangement of claim 1 wherein the source of supply voltage is an ordinary electric utility power line.

3. The arrangement of claim 1 wherein the lamp means comprises a gas discharge lamp.

4. The arrangement of claim 1 wherein the power supply means comprises DC-to-AC conversion means.

5. The arrangement of claim 1 wherein the frequency of the AC voltage is lower when the supply voltage is provided between the first and the second power input terminal as compared with the situation wherein the supply voltage is provided between the first and the third power input terminal.

6. The arrangement of claim 1 combined with switch means interposed between the source and the power input terminals, thereby to permit connecting the supply voltage either between the first and the second power input terminal or between the first and the third power input terminal.

7. An arrangement comprising:
a source of supply voltage;
lamp means having lamp terminals; and
power supply means having a first, a second and a third power input terminal; the power supply means having output terminals connected with the lamp terminals and being operative to provide AC current to the lamp means in response to being provided with the supply voltage between the first and either the second or the third power input terminal; the frequency of the AC current being higher when the supply voltage is provided between the first and the second power input terminal than when the supply voltage is provided between the first and the third power input terminal.

8. An arrangement comprising:
a source of alternating supply voltage;
gas discharge lamp means having lamp terminals;
power supply means having input terminals and output terminals; the output terminals being connected with the lamp terminals; the power supply means being operative to provide an AC current to the lamp means in response to being provided with the supply voltage at its input terminals; the frequency of the AC current being higher than that of the supply voltage; the power supply means having control means connected in circuit with the input terminals and operative on receipt of a control action to control the magnitude of the AC current; and control action means connected in circuit between the source and the input terminals; the control action means being operable in response to a command input to provide the control action, thereby to control the magnitude of the AC current.

9. The arrangement of claim 8 wherein the command input comprises manual input means responsive to manual inputs, thereby to produce said control action.

10. The arrangement of claim 8 wherein the source of supply voltage is an ordinary electric utility power line.

11. The arrangement of claim 8 wherein a variation in the magnitude of the AC current results in a corresponding variation in the frequency of the AC current.

12. The arrangement of claim 11 wherein a decrease in the magnitude of the AC current results in an increase int he frequency of the AC current.

13. An arrangement comprising:

a source of alternating supply voltage;

lamp means having lamp terminals; and power supply means having output terminals as well as a first and a second pair of input terminals; the power supply means having rectifier means connected with the input terminals, thereby to provide a DC voltage; the DC voltage being applied to an inverter means connected with the output terminals; the output terminals being connected with the lamp terminals; the power supply means being operative to provide an AC current to the lamp means in response to being provided with the supply voltage across one of its pairs of input terminals; the frequency of the AC current being substantially higher than that of the supply voltage; the magnitude of the AC current being higher when the supply voltage is provided across the first pair of input terminals than when it is provided across the second pair of input terminals.

14. An arrangement comprising:

a source of power line voltage;

rectifier means having a first and a second pair of input terminals, each pair being operative selectively to be connected with the power line voltage; the rectifier means being operative to provide a DC voltage at a set of DC terminals; and inverter means connected with the DC terminals and operative to provide an AC current to a lamp means; the inverter means being responsive to the manner in which the power line voltage is connected with the two pair of input terminals, such that: (i) when the power line voltage is connected across the first pair of input terminals, the inverter means responds by causing the magnitude of the AC current to be relatively low, and (ii) when the power line voltage is connected across the second pair of input terminals, the inverter means responds by causing the magnitude of the AC current to be relatively high.

15. The arrangement of claim 14 wherein the magnitude of the DC voltage is substantially the same regardless of whether the power line voltage is connected with the first or the second pair of input terminals.

16. The arrangement of claim 14 additionally comprising control means connected in circuit between the source and the rectifier means; the control means being operative to permit manual selection of whether the power line voltage be connected with the first or the second pair of input terminals.

* * * * *